United States Patent [19]

Tsai et al.

[11] Patent Number: 5,119,258
[45] Date of Patent: Jun. 2, 1992

[54] MAGNETIC DISC WITH LOW-FRICTION GLASS SUBSTRATE

[75] Inventors: Hsiao-Chu Tsai, Fremont; Atef H. Eltoukhy, Saratoga, both of Calif.

[73] Assignee: HMT Technology Corporation, Fremont, Calif.

[21] Appl. No.: 475,715

[22] Filed: Feb. 6, 1990

[51] Int. Cl.⁵ .................. G11B 5/82; G11B 5/712; G11B 5/72
[52] U.S. Cl. .................. 360/135; 428/694; 428/900
[58] Field of Search .......... 360/135, 136, 134, 131; 428/694, 900; 427/131, 132

[56] References Cited

U.S. PATENT DOCUMENTS

| | | | |
|---|---|---|---|
| 4,003,813 | 1/1977 | Hattori et al. | 204/192 |
| 4,347,689 | 9/1982 | Hammond | 51/281 SF |
| 4,430,782 | 2/1984 | Bornhorst et al. | 29/90 R |
| 4,469,566 | 9/1984 | Wray | 204/123 |
| 4,546,036 | 10/1985 | Renalls et al. | 360/135 |
| 4,656,790 | 4/1987 | Mukai et al. | 51/141 |
| 4,720,411 | 1/1988 | Shimozawa et al. | 428/694 |
| 4,732,814 | 3/1988 | Hatada et al. | 428/694 |
| 4,735,840 | 4/1988 | Hedgcoth | 428/694 |
| 4,803,577 | 2/1989 | Ezaki et al. | 360/102 |
| 4,820,584 | 4/1989 | Morita et al. | 428/694 |
| 4,880,514 | 11/1989 | Scott et al. | 427/132 |
| 4,898,774 | 2/1990 | Yamashita et al. | 428/694 |
| 4,908,727 | 3/1990 | Ezaki et al. | 360/135 |
| 4,954,904 | 9/1990 | Goor | 360/103 |

Primary Examiner—John H. Wolff
Assistant Examiner—Craig A. Renner
Attorney, Agent, or Firm—Peter J. Dehlinger

[57] ABSTRACT

A thin-film medium formed on a low-friction glass substrate. The substrate is micro-roughened by plasma etching, under conditions which produce a desired surface density of zero crossings and depth of microscopic surface irregularities.

4 Claims, 3 Drawing Sheets

MAGNETIC DISC WITH LOW-FRICTION GLASS SUBSTRATE

FIELD OF THE INVENTION

The present invention relates to a thin-film magnetic disc having a glass substrate, and to a method of texturing the substrate to achieve a disc with a low-friction surface.

BACKGROUND OF THE INVENTION

Thin-film hard disc magnetic media are widely used for on-line data storage in computers. There are several magnetic and surface properties which are important to the recording density, as well as to disc lifetime and wear characteristics. The most important of these are:

(1) Magnetic remanence, which determines the signal amplitude which can be read from an isolated pulse stored in the medium—the greater the remanence, the greater the signal amplitude which can be detected in a reading operation.

(2) Coercivity, defined as the magnetic field required to reduce the remanence magnetic flux to 0, i.e., the field required to erase a stored bit of information. Higher coercivity in a medium allows adjacent recorded bits to be placed more closely together without mutual cancellation. Thus, higher coercivity is associated with higher information storage density.

(3) Bit shift or peak shift, a phenomenon which refers to the broadening between voltage peaks which occurs in the read voltage waveform It is desired to achieve low bit shifting, inasmuch as bit shifting limits the resolution at which adjacent peaks can be read, and thus places an upper limit on recording density.

(4) Flying height, i.e., the distance which a read/write head floats above the spinning disc. Less overlap of voltage signals in adjacent magnetic domains in the disc occurs as the read/write head is moved closer to the disc surface, allowing recording density to be increased. The flying height is limited principally by surface irregularities in the disc.

(5) Surface imperfections and irregularities. Such can lead to excessive interactions between the disc and the head, and limit the flying height of the head which can be safely employed.

(6) Stiction, or static friction, defined as the frictional contact between the disc and read/write head when the head is parked on the disc and the disc first begins to rotate. Low stiction reduces wear on the disc and head with repeated stop/start operations.

(7) Surface durability, which provides increased disc lifetime and reduced head wear.

Heretofore, discs having high coercivity and remanence characteristics have been prepared by sputtering a thin magnetic film on a metal substrate, typically an aluminum substrate. Prior to sputtering, the substrate is textured by grinding, typically using a rotary abrasive pad placed off center with respect to the surface of the spinning substrate. The purpose of the texturing is create a roughened surface characterized by submicron surface irregularities. The roughened surface reduces stiction between the disc and head by reducing surface contact between the two.

Before texturing, the metal substrate is plated with a selected alloy, such as nickel/phosphorus, to achieve a requisite surface hardness. The plated disc is then polished to remove surface nodules which form during the plating process. Because the nodules have varying degrees of hardness, the polishing step tends to leave surface irregularities in the form of surface depressions or mounds.

The sputtering operation used to produce the thin magnetic film is preferably carried out by first sputtering a chromium underlayer onto the substrate surface, then sputtering a cobalt-based magnetic thin film over the underlayer. A protective, lubricating carbon overcoat may then be applied over the thin-film layer by sputtering. The resulting disc can have high coercivity and remanence properties, as described in co-owned U.S. Pat. No. 4,816,127, and good wear and lubricity properties, as described in co-owned U.S. patent applications Ser. No. 341,550 filed Apr. 21, 1989, and Ser. No. 341,705, filed Apr. 21, 1989.

Despite the favorable magnetic and surface-wear properties which can be achieved in the above-described thin-film magnetic disc formed on a metal substrate, the recording density of the disc is limited in flying height by the irregularities on the disc surface (due to surface irregularities in the plated metal substrate). The best flying head distances which have been achieved with metal-substrate discs is about 6 $\mu$inches.

It is possible to reduce flying height, and therefore increase recording density, by forming a thin-film magnetic layer on a smooth-surfaced substrate, such as a highly polished glass or ceramic substrate. However, this approach has generally been limited by difficulties which have been encountered in (a) achieving a high-coercivity, high-remanence, low bit shift magnetic film on a glass substrate by sputtering, and (b) texturing the substrate to produce a low-stiction disc surface The former limitation has been addressed in co-owned U.S. patent application Ser. No. 408,655 filed Sept. 19, 1989. The second limitation is the subject of the present application.

SUMMARY OF THE INVENTION

It is therefore one general object of the present invention to provide a method of texturing the surface of a glass substrate which can be controlled to achieve a selected surface density of nm-range surface irregularities, preferably with a selected depth of irregularities, which have been found to be necessary to produce a minimum coefficient of static friction, or stiction, as measured with a read/write head placed against the surface of a thin-film disc.

The invention includes, in one aspect, a method of microroughening the surface of a glass substrate to achieve a low coefficient of static friction in a thin-film disc. The method employs plasma etching to create the desired nm-range surface irregularities in the glass surface. The plasma is produced by radio frequency glow discharge of an etchant gas containing between 4 and 70 mole percent $O_2$ and between 30 and 96 mole percent of a normally inert halocarbon gas. The plasma is allowed to interact with the glass surface for a period sufficient to produce a surface density of zero crossings, measured along any axis in the surface plane, of at least about 40/mm.

In a preferred embodiment, the gas plasma is further allowed to interact with the glass surface for a period sufficient to produce a peak-to-valley distance, defined as the maximum depth of the nm-range irregularities on the surface of glass, of at least about 12–13 nm, i.e., about 0.5 $\mu$inch.

The method is preferably carried out under conditions such that the desired density of surface irregularities and the depth of irregularities is achieved after about 3-30 minutes, and more typically 3-15 minutes of exposure of the glass surface to the plasma. The RF power level is between about 300-600 watts.

Also forming part of the invention is a glass substrate formed by the method of the invention. The substrate is characterized by a surface density of nm-range surface irregularities, measured along any axis in the surface plane, of at least about 40/mm. The depth of the surface irregularities is preferably such that the surface of the thin-film disc, after sputtering a thin-film magnetic layer and a carbon overcoat on the glass surface, of at least about 12-13 nm.

In yet another aspect, the invention includes a thin-film magnetic disc composed of (a) the above micro-roughened glass substrate, (b) a chromium underlayer formed on the substrate surface, (c) a thin-film magnetic layer formed on the underlayer, and (d) a carbon overcoat. The magnetic disc preferably has a coefficient of static friction, as determined by the friction force in a mini-composite 10 g read/write head placed on the disc, when rotation of the disc is initiated, between about 2-3 grams.

These and other objects and features of the present invention will become more fully apparent when the following detailed description of the invention is read in conjunction with the accompanying drawings.

DETAILED DESCRIPTION OF THE DRAWINGS

Details of the glass micro-roughening method of the invention are given in Section I below. The surface features of the micro-roughened glass surface can be characterized by a surface density of zero crossings and a peak-to-valley depth of nm-range irregularities, and these parameters can be controlled to minimize the static frictional coefficient of a thin-film medium formed on the micro-roughened substrate, as described in Section II. Section III describes a thin-film magnetic disc formed by sputtering a magnetic thin film on the substrate, and characterized by a low static coefficient of friction.

I. Glass Micro-Roughening Method

Figure 1:
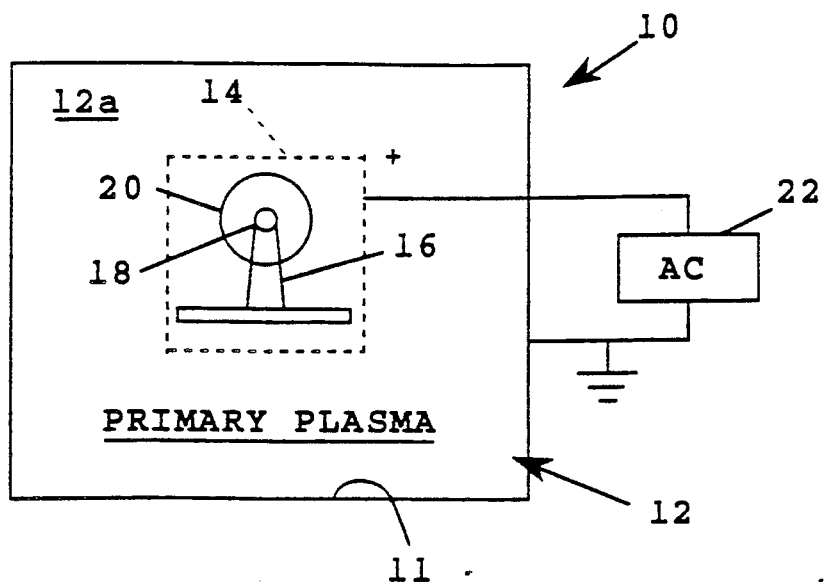
FIG. 1 illustrates, in schematic view, a cage configuration of a radio frequency glow discharge apparatus used in micro-roughening a glass substrate surface, in accordance with the present invention.
Figure 2:
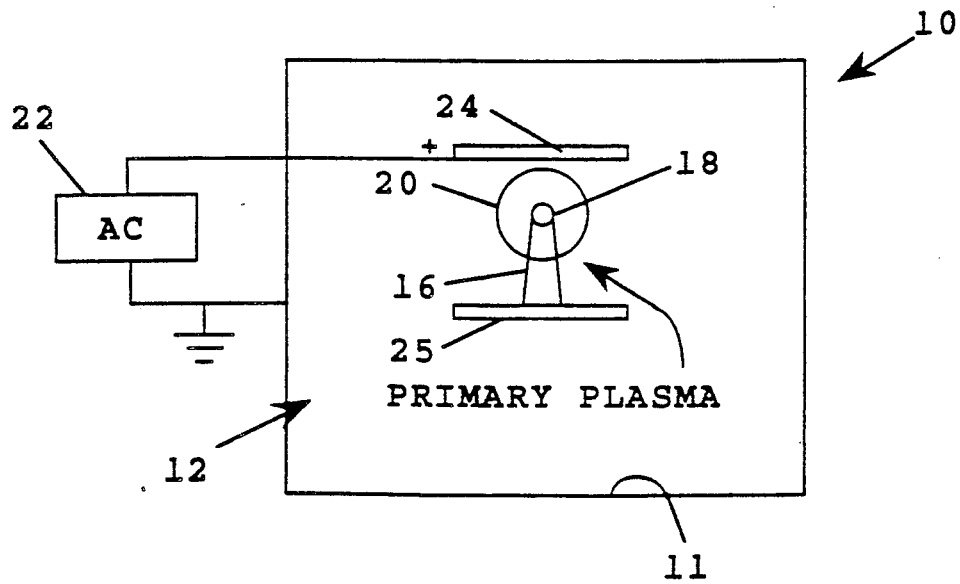
FIG. 2 illustrates, in schematic view, a shelf configuration of a radio frequency glow discharge apparatus used in roughening a glass substrate surface, in accordance with the method of the invention.

FIGS. 1 and 2 show, in schematic view, an plasma etching apparatus 10 which is suitable for use in practicing the glass substrate micro-roughening method of the invention. The apparatus includes an enclosed, pressure-tight chamber 12 having conductive inner walls 11. The apparatus includes gas-flow and pressure controls (not shown) for maintaining a selected pressure of a given gas composition introduced into the chamber. A metallic fixture 16 in the chamber has a mandrel 18 constructed to support glass substrates, such as substrate 20, with both sides of each substrate exposed. The fixture may be insulative or formed of a conductive material such as aluminum. The apparatus also includes a radio-frequency (RF) alternating current power source 22 which can be adjusted to a selected power level and automatically matched to the impedance of the reactor.

The configuration of the apparatus shown in FIG. 1 is a "cage" configuration in which the substrates are enclosed within a metal cage 14 whose sides are formed of a conductive-metal screen which allows plasma gas formed within the chamber to pass freely into and out of the interior of the cage. One of the RF electrodes in the apparatus is connected to cage 14, and the other is connected to the conductive walls of the chamber and is grounded, as shown. With application of a radio frequency voltage across the electrodes, in the presence of an ionizing gas, a primary plasma or glow discharge is formed in the chamber region 12a outside cage 14, such that the glass substrate is exposed to a secondary plasma etching effect.

The configuration of the apparatus shown in FIG. 2 is a "shelf" configuration in which the substrates are positioned between two metallic shelves 24, 25. The anodic and cathodic electrodes of the power source are connected to the two shelves, as shown. With application of a radio frequency voltage across the two electrodes, in the presence of an ionizing gas, a primary plasma or glow discharge is formed in the entire chamber, such that the glass substrate is directly exposed to a primary plasma etching effect.

One plasma etching apparatus which is suitable for use in the present invention is a Branson Model 4055 gas plasma system.

The glass substrate used in the invention is preferably a highly polished sodalime or aluminosilicate glass substrate having conventional thin-film disc dimensions, typically about 0.05 inches thick and 3.5 inches in diameter. Smooth-surfaced substrates of this type are available from Hoya (Japan), Graverbel (Belgium), and Pilkington (United Kingdom). Example 1 below describes the micro-roughening method applied to both sodalime glass and aluminosilicate glass.

The substrate is placed within the apparatus 10, and the chamber of the apparatus is filled with a gas capable of forming a glow discharge plasma in a radio-frequency field. The gas is preferably composed of between about 4-70 mole percent oxygen and between about 30-96 mole percent of a halocarbon gas. One preferred gas composition, employed in Example 1B, contains 96 mole percent halocarbon and 4 mole percent $O_2$.

One preferred halocarbon gas is carbon tetrafluoride, $CF_4$, which is a normally inert gas that does not react directly with Si at any temperature up to the $CF_4$ boiling point of T=1685° K. However, if an electrical discharge is initiated in $CF_4$, atomic fluorine is produced as a reaction product (shown in the reactions below), and the activated fluorine atoms react spontaneously with the silicon at room temperature and above to form a volatile gas, $SiF_4$, which will not be decomposed in the plasma. Other replacements for $CF_4$ are $C_2F_6$, $CHF_3$, $C_3F_8$, $CF_4+H_2$ and $SF_4$.

Possible ionization and etching reaction which may occur in an $O_2/CF_4$ gas mixture are shown below.

$$O_2 e^- \rightarrow O^+ + O^* + e^-,$$

$$CF_4 + e^- \rightarrow CF_3 + F^* + e^-,$$

$$CF_4 + e^- \rightarrow CF_n^* + (4-n)F^* - + ne^- (n=1,2,3.)$$

$$Si-O+e^- \rightarrow Si^* + O + e^-,$$

$$Si^* + 4F \rightarrow SiF_4 \text{ (volatile)}.$$

As seen from the reactions above, electrons produced by ionization of both $O_2$ and the halogenated gas produce halogen radicals ($F^*$) which react with Si atom on the glass surface to remove Si atoms by volatilization of $SiF_4$ product formed on the surface.

More generally, the gas composition used in the present invention is capable, under ionization conditions, of reacting with free Si atoms on the glass surface, to scavenge the free Si and to produce a volatile product gas, such as $SiF_4$, that is unlikely to redeposit on the adjacent glass surface.

By contrast, processes such as reactive ion beam etching (RIBE) and ion milling are unsuitable for this purpose because they produce non-volatile reaction products that permit redeposition and trenching to occur, as discussed in S. Wolf and R. H. Tauber in Silicon Processing for the VLSI Era, Vol. I. Lattice Press, 1986, pp. 539-585).

For $O_2$ present in the gas composition, the etch rate generally increases up to about 20 mole percent, beyond which a decrease in etch rate may be observed. See S. M. Sze (editor), VLSI Technology, McGraw-Hill Book Co., 198, Chap. 8 by C. J. Mogab, pp. 324-326.).

The plasma etch process uses moderately high gas pressures, of the order of 0.2-1 Torr, preferably about 0.4 Torr, at room temperature, which allows a relatively isotropic etch process to occur at the surface of the glass.

The RF power source is set to a power level sufficient to produce plasma glow discharge within the chamber, and preferably at a power level between about 300-600 watts. These settings apply to both the cage and shelf configurations, although higher power levels may be required in the cage configuration, for comparable etch times.

According to an important feature of the invention, the plasma etching is carried out for a period which is sufficient to achieve desired surface characteristics related to (a) density of zero crossings and (b) peak-to-valley distances of nm-range irregularities formed on the surface by the plasma etching process.

Figure 3A:
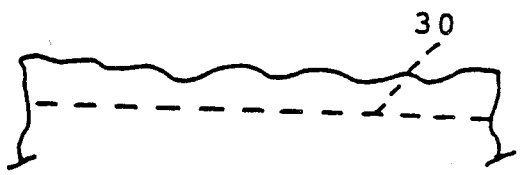
FIGS. 3A-3C show enlarged cross-sectional regions of a glass substrate surface prior to micro-roughening (3A), after micro-roughening under conditions which produce a desired surface density of zero crossings and depth of nm-range irregularities on the glass surface, in accordance with the invention (3B), and after prolonged exposure to plasma etching (3C)
Figure 3B:
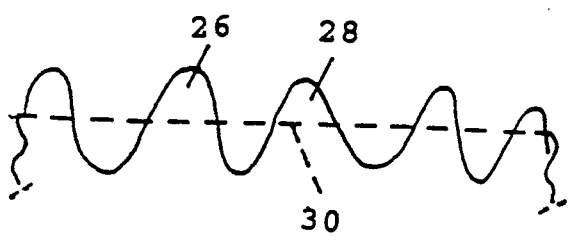
Figure 3C:
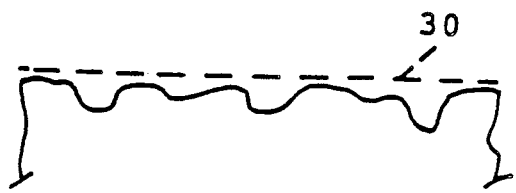

These surface parameters, which will be described in detail in Section II below, can be appreciated from the surface irregularity changes which occur during plasma etching, as illustrated in FIGS. 3A-3C. The microscopic relief of a highly polished glass substrate surface prior to treatment is seen in FIG. 3A. With isotropic plasma etching, nm-range surface irregularities, such as seen at 26, 28 in FIG. 3B, are produced. During the initial stages of etching the surface irregularities show a time-dependent increase in peak-to-valley depth and number of crossings through a centerline, shown in dotted line at 30 in FIG. 3B. The centerline is the mean "depth" at which the integrated peak and valley areas are equal. The position of this line is also shown in FIG. 3A and 3C.

With continued etching, the peaks of the irregularities become etched preferentially, producing the more flattened surface irregularities seen in FIG. 3C. The surface irregularities in this figure have lower peak-to-valley depths and a lower density of zero-crossings.

The time of exposure needed to achieve the desired zero-crossing and peak-to-valley depth will depend on gas pressure and composition, RF power level in the plasma chamber, and whether a shelf or cage configuration is employed. At the gas pressure, composition, and power settings described above, typical etching times are between about 3-30 minutes, and preferably between about 3-15 minutes. As noted above, optimal plasma etch times for the shelf configuration (where the substrate is exposed to the primary plasma) are generally shorter than those for the cage configuration, at comparable gas composition and power conditions.

The optimal time of etching can be determined readily for any specified gas composition and power settings. This is done by exposing a series of identical glass substrates to the selected plasma etch conditions for increasing time increments of, for example, 5 minute, for a 3-30 minute interval. The zero-crossing and peak-to-valley values of each substrate are then determined, as described in Section II for each substrate or for a thin-film medium formed on the substrate. After identifying the plasma etch time which gives highest zero-crossing and/or peak-to-valley values, the exposure time can be refined by looking at, for example, a number of 1 minute incremental times on either side of the previously selected etching time. The examples below illustrate plasma etching times employed under a variety of etching conditions, and the surface properties which were observed under each set of conditions.

II. Low-Friction Surface Parameters

As noted above, FIG. 3B shows a representative cross-sectional view of a surface at the sub-micron level, after a selected period of plasma etching.

One surface parameter which was examined is the linear density of zero crossings, $Z_c$. Quantitatively, $Z_c$ is defined by $$Z_C = (N_{max} + N_{min})/L$$

Where $N_{max}$ and $N_{min}$ are the number of peaks and valleys, respectively, over a length L along any axis.

A second surface parameter is the distance, normal to the surface, between the highest peak and the lowest valley within a given area, e.g., 250 $\mu^2$, of the surface.

A third surface parameter which may be measured is the surface density of summits, defined simply as the number of peaks of surface irregularities, such as irregularities 26, 28 in FIG. 3B, over a given area or along a given length L of a surface axis. Since a surface irregularity may not necessarily cross the center line, the linear density of summits will generally be greater than the linear density of zero-crossings.

The three surface parameters above can be measured by interferometer, in which the heights at many positions over the surface of the substrate is measured, and these coordinates are used to construct a three-dimensional topographic map of the surface. The coordinates are then used to calculate (a) arithmetic mean roughness, (b) linear density of zero-crossings, (c) maximum peak-to-valley depth, and (d) surface area density of summits.

The interferometry measurements and calculations can be performed by commercially available interferometers, equipped with known microcomputer capability for calculating the above four surface parameters. One interferometer which is suitable for this purpose is a phase-shifting interferometer, Model TOPO-3D by WYKO Co. (Tuscon, Ariz.).

Since much of the light which is directed against the glass substrate surface in an interferometry measurement is lost as transmitted light, the interferometer typically must be equipped with sensitive optics, in order to obtain reliable surface height measurements. This sensitivity can be achieved in the above interferometer.

Alternatively, the surface features can be measured by metallizing the surface, for example, with a thin sputtered metal layer before making the surface measurements. One standard approach which has been used herein involves forming a thin-film magnetic disc, including a carbon overcoat, on the glass substrate, and making the surface measurements on the finished disc. One preferred disc, and sputtering method for making the disc, are described in Section III below. This approach to determining the surface features of a substrate assumes that (a) the surface features of the substrate are substantially preserved in the sputtered layers, and (b) the semi-transparent carbon overcoat does not significantly alter the surface height measurements made by interferometry. The advantage of this approach, as will now be seen, is that surface parameters related to the glass substrate can be directly correlated with frictional coefficient values measured on a coated magnetic thin film disc.

Glass substrates were micro-roughened by plasma etching under various gas composition, gas pressure, RF power level and exposure time conditions, on soda-lime or aluminosilicate glass substrates. After plasma etching, the substrates were sputtered to form, successively, a chromium underlayer, a cobalt-based magnetic thin film, and a carbon overcoat, according to the sputtering methods detailed in Section III. Each disc was then examined by interferometry, as above, to determine mean surface roughness height, linear density of zero crossings, peak-to-valley depth, and density of summits on the disc surface.

Figure 6:
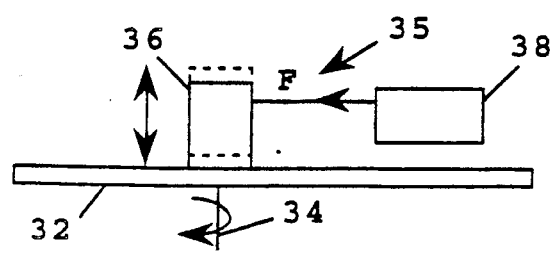
FIG. 6 illustrates, in schematic view, the configuration of a disc and a ten-gram read/write head used in making the force measurements plotted in FIGS. 4 and 5.

FIG. 6 is a schematic view of a device 35 used in measuring the static coefficient of friction of a carbon-overcoated surface on a disc, such as a disc 32. The device used in this test is a "Dysan" tester for measuring the stiction and friction coefficient of a disc.

Briefly, the device includes a motor-driven rotor, indicated at 34, for rotating the disc at a low speed, typically about 1 rpm. A standard 10-gram mini-composite read/write head 36 can be switched between a contact position (solid lines) and a non-contact or un- loaded position (dotted lines) with respect to the disc. This head, in turn, is coupled to a force transducer 38 which measures the force F (in the circumferential direction) applied to the head upon rotation of the disc.

Figure 4:
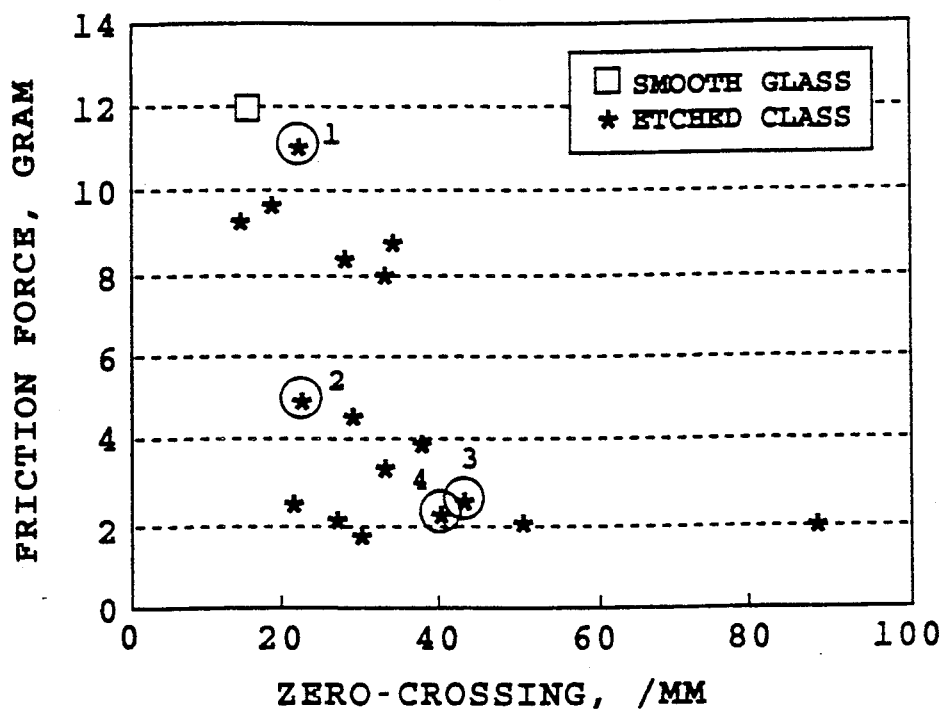
FIG. 4 is a plot of experimentally determined static frictional force between a ten gram head and a glass surface, as a function of surface density of zero-crossings of nm-range surface irregularities.

FIG. 4 shows a scatter plot of stiction coefficient measurements (expressed in grams of force applied to transducer 38) as a function of linear density of zero crossings, based on stiction coefficient and zero-crossing measurements made on the several discs whose substrates were prepared under various plasma etching conditions, as described above. The points numbered 1–4 in the figure (and in FIG. 5), correspond to discs whose substrates were prepared as described Examples 1A, 1B, 2, and 1C, respectively. In the range between 20–40 zero-crossings, there is a general trend toward lower striction coefficient with higher linear density of zero crossings, but also considerable scatter in this area. In the range above about 40/mm, there is a strong correlation between linear density of zero crossings and low stiction coefficient, with values of about 2 grams.

Figure 5:
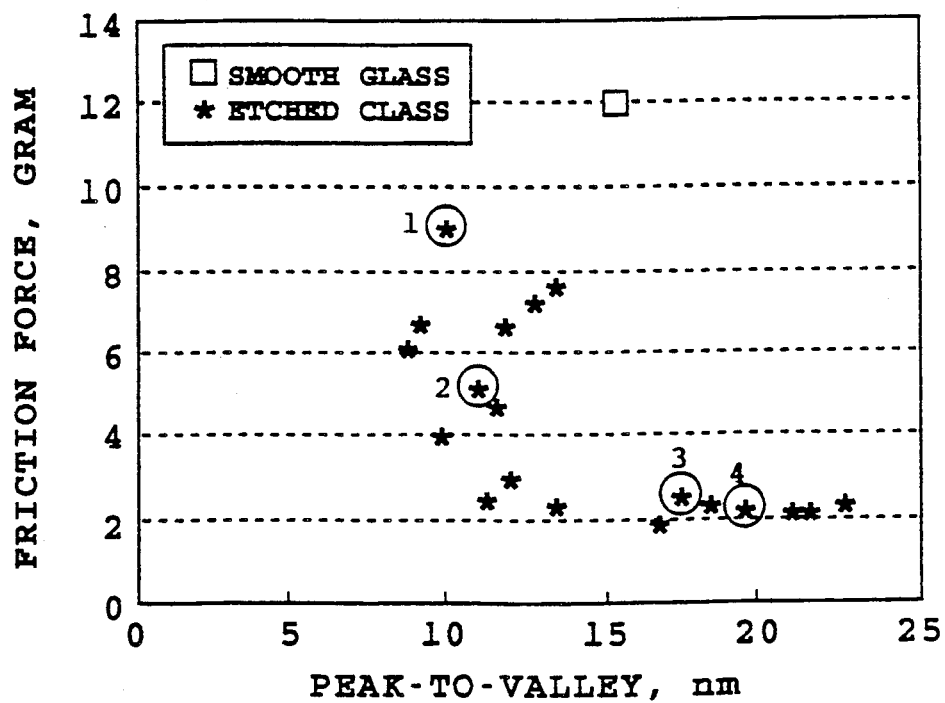
FIG. 5 is a plot of experimentally determined static frictional force between a ten-gram head and a glass surface, as a function of peak-to-peak depth of nm-range surface irregularities.

FIG. 5 shows a scatter plot of stiction coefficient measurements as a function of peak-to-valley depth, for the same discs. In the range less than about 12–13 nm peak-to-valley depth, there is a general trend toward lower stiction coefficient with greater depth, but also considerable scatter in this area. In the range above 12–13 nm, there is a strong correlation between peak-to-valley depth and low stiction coefficient, again with values of about 2 grams.

A similar scatter plot of stiction coefficient as a function of summit density (not shown) gave no clear correlation between density of summits and stiction coefficient.

It will be appreciated from the foregoing that the substrate micro-roughening method of the invention is carried out under conditions which produce a linear density of zero-crossings in the nm-range irregularities on the disc surface of at least 40/mm, as measured either in the substrate or a thin-film disc formed on the substrate. In a preferred embodiment of the invention, the etching conditions are also selected to produce a peak-to-valley depth of the surface irregularities of at least about 12–13 nm.

III. Thin-Film Disc

Figure 7:
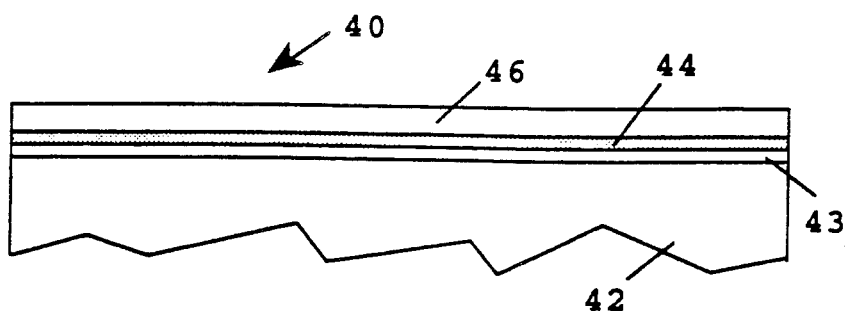
FIG. 7 shows an enlarged, fragmentary cross-section of a thin-film magnetic disc formed in accordance with the present invention.

FIG. 7 shows an enlarged, fragmentary cross-sectional view of a thin-film magnetic disc 40 formed in accordance with the invention. The disc generally includes a glass substrate 42 which has been micro-roughened as above to have a linear density of zero crossings of at least about 40/mm, and a peak-to-valley depth of at least about 12–13 nm.

The three layers formed on the substrate include a chromium underlayer 43, a thin-film magnetic layer 44, and a carbon overcoat 46. These layers are preferably formed by sputtering, according to known methods (e.g., U.S. Pat. No. 4,816,127). Briefly, the substrate is placed in a conventional sputtering apparatus and moved through a succession of sputtering chambers designed for sputtering onto the substrate (a) a chromium underlayer, to a thickness of about 400 to 4,000 Å (b) a thin-film magnetic layer, to a thickness of about 300–1,500 Å, and a carbon overcoat of about 250–600 Å. The chromium underlayer is preferably deposited in a two-step sputtering operation, as described in the above-noted U.S. patent application for "High-Coercivity Disc with Glass Substrate". The thin-film layer is preferably a cobalt-based alloy containing, in one embodiment, 1-10% tantalum, 10-16% chromium, and 60-85% cobalt, and in another embodiment, 2-10% chromium, 20-28% nickel, and 70-88% cobalt.

The nm-range surface characteristics of the disc were examined by interferometry and for stiction coefficient, as described above. As detailed above, low stiction coefficients (less than about 2 grams) were observed for all discs in which the linear density of zero crossings was greater than about 40/mm, and where the peak-to-valley height was greater than about 12-13 nm.

From the foregoing, it can be appreciated how various objects and features of the invention have been met. The glass micro-roughening method is rapid, controllable, according to selected etching conditions, and reproducible. In particular, the plasma etching conditions can be selected to achieve zero-crossing and maximum peak-to-valley depth which insure low stiction.

The following examples illustrate glass surface microroughening under a variety of substrate, gas composition, pressure, power, and etching time conditions, and the surface characteristics which were achieved under the various conditions. The examples are intended to illustrate, but in no way limit, the method of the invention.

EXAMPLE 1

Plasma Etching in a Shelf Configuration

A group of glass substrates were placed in the shelf configuration on a fixture within the chamber of a Branson Model 4055 gas plasma system (Hayward, Cal.). The RF power supply in the machine was connected between the cage and the interior walls of the chamber. Thus the primary plasma was formed in the region outside the cage.

A. Sodalime glass substrate 95 mm sodalime glass substrates, 1.27 mm thick, were obtained from Graverbel (Belgium). The discs were placed on the shelf of the etching machine, and the chamber was filled with an etchant gas containing 50 mole percent each of $CF_4$ and $O_2$, at a total pressure of 0.4 Torr. The RF power supply was set 500 Watts, and the plasma formed in the chamber was allowed to interact with the glass substrate for 10 minutes.

The glass substrates were used in forming thin-film media by sputtering a chromium underlayer on each glass substrate, to a final underlayer thickness of about 500 Å, and a thin-film magnetic disc to a final magnetic layer thickness of about 500 Å. A carbon overcoat having a final thickness of about 300 Å was sputtered over the magnetic layer. The sputtering method for forming the disc generally follows the procedure described above.

The depth of density of nm-range irregularities in the disc surfaces were determined by interferometry, using a WYKO interferometer TOPO-3D. The average values calculated for the disc reflecting the depth and density of nm-range surface irregularities on the glass substrates were: linear zero-crossing density of 24/mm and maximum depth peak-to-valley of about 9.8 nm.

The static coefficient of friction of the thin-film disc was measured using a standard ten-gram mini-composite head. The force exerted on the head as the discs were rotated from a stationary position was measured at 9 grams, given a stiction coefficient defined as the observed force/load on the head equal to 0.9. The point for the group of discs is indicated by 1 in FIGS. 4 and 5.

B. A group of 95 mm sodalime glass discs was obtained from Pilkington (United Kingdom). Plasma etching conditions were identical to those used in Example 1A. A thin-film medium having a carbon overcoat was formed on the substrate as above, and the density and depth of nm-range surface irregularities were measured by interferometry, as above. The linear zero-crossing density of nm-range irregularities at the disc surface was measured at 22/mm, with a maximum peak-to-valley depth of about 12 nm. The coefficient of static friction, measured as above, was about 0.49. This disc group is represented by point 2 in the FIG. 4 and FIG. 5 plots C. Aluminosilicate Glass A group of 130 mm aluminosilicate glass discs were obtained from Hoya (Japan). Plasma etching conditions were similar to those in Example 1A, except that the gas mixture contained 96 mole percent $CF_4$ and 4 mole percent $O_2$, and the total etching time was 5-15 minutes.

A thin-film medium having a carbon overcoat was formed on the substrate as above, and the density and maximum peak-to-valley depth of nm-range surface irregularities were measured by interferometry, as above. The average value linear zero-crossing density of nm-range irregularities at the disc surfaces was measured at 43/mm, with an average maximum peak-to-valley depth of about 19 mm. The average coefficient of static friction, measured as above, was about 0.22. This group of discs is represented by point 4 in the FIG. 4 and FIG. 5 plots.

EXAMPLE 1

Plasma Etching in a Cage Configuration

A group of 95 mm sodalime glass discs was obtained from Pilkington (United Kingdom). Plasma etching was done in a larger system with a barrel-type chamber (Model 7150) in a cage configuration. The plasma condition used was: (a) the etchant gas contained 30 mole percent CF and 70 mole percent $O_2$ at a total pressure of 0.3 Torr, (b) the RF power source was adjusted to a power output of 750 watts, and (c) plasma etching was carried out for 10 minutes.

A thin-film medium having a carbon overcoat was formed on each of the substrates as above, and the density and depth of nm-range surface irregularities were measured by interferometry, as above. The linear zero-crossing density of nm-range irregularities at the disc surface was measured at 44/mm, with a maximum peak-to-valley depth of about 18 nm. The coefficient of static friction, measured as above, was about 0.26. This disc group is represented by point 3 in the FIG. 4 and FIG. 5 plots.

Although preferred embodiments of the invention have been described, it will be apparent to those skilled in the art that various changes and modifications can be made without departing from the invention.

It is claimed:

1. A thin-film magnetic disc comprising
   (a) a micro-roughened glass substrate having a linear density of "zero-crossing", defined in a surface cross-sectional profile having a series of peaks and valleys, as a number of surface profile crossings through a centerline which is located at a surface depth at which the integrated peak areas are equal to integrated valley areas for a given length along said profile, of at least about 40/mm, and a peak-to-valley distance, defined as a maximum depth of surface irregularities in a thin-film magnetic medium, in a given area, of greater than about 12 nm, (b) a magnetic thin film formed by sputtering on the substrate, and (c) an overcoat formed on the magnetic thin film whereby stiction is reduced.

2. The disc of claim 1, wherein is further characterized by said peak-to-valley distance of less than about 25 nm.

3. The disc of claim 1, whose surface uniformity allows a read/write flying head to fly over the disc at a height of between 2-4 $\mu$inches.

4. The disc of claim 1, wherein said overcoat is a sputtered carbon overcoat and the disc is characterized by a coefficient of static friction, as measured by a friction force produced in a ten-gram mini-composite read/write head, when the disc is first caused to rotate, less than about 3 grams.

* * * * *